March 19, 1968 W. L. LAWSON 3,373,670
CAMERA
Filed May 25, 1965 4 Sheets-Sheet 1
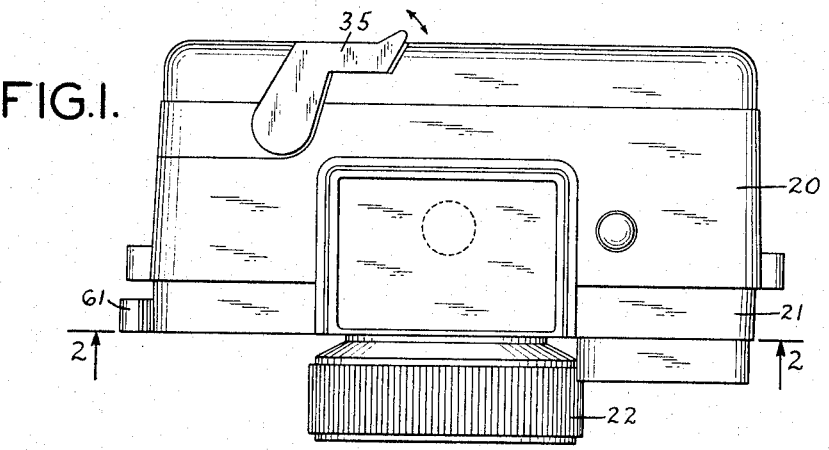
FIG.1.
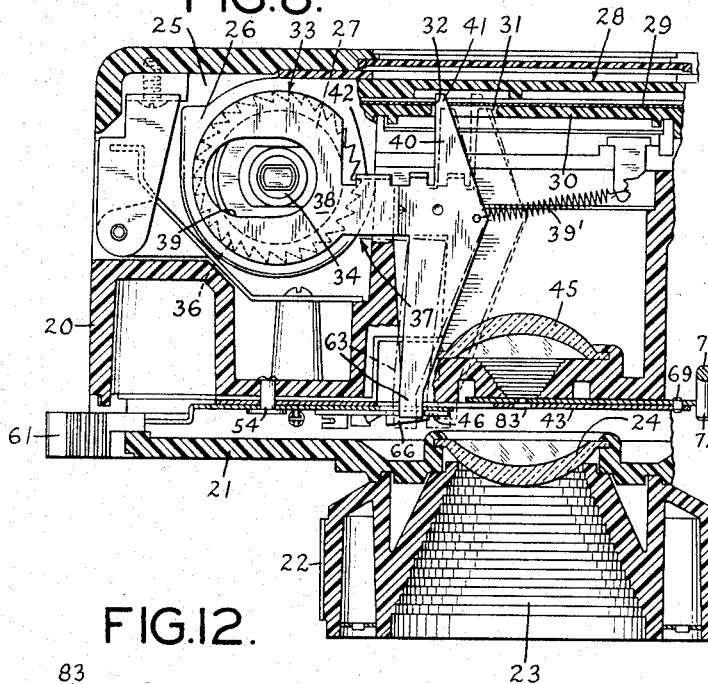
FIG.8.
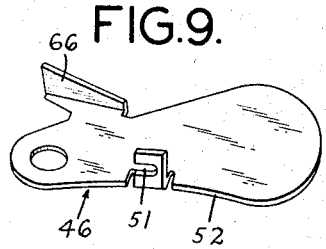
FIG.9.
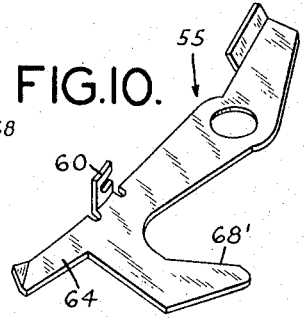
FIG.10.
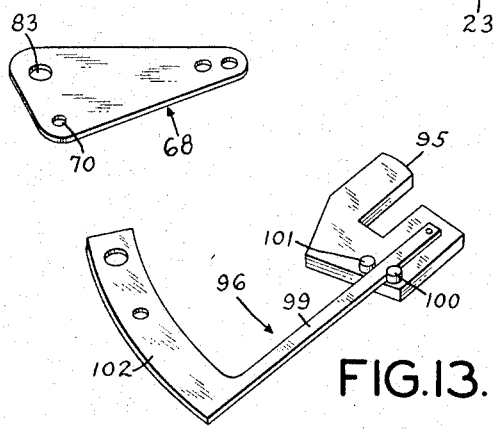
FIG.12.
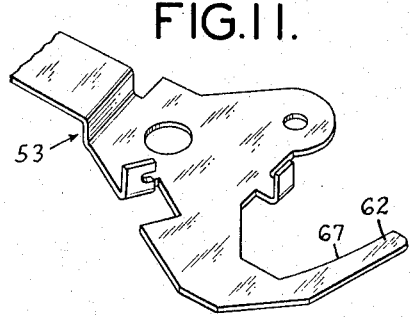
FIG.11.
FIG.13.

March 19, 1968  W. L. LAWSON  3,373,670
CAMERA

Filed May 25, 1965

March 19, 1968    W. L. LAWSON    3,373,670
CAMERA
Filed May 25, 1965    4 Sheets-Sheet 3

March 19, 1968 W. L. LAWSON 3,373,670
CAMERA

Filed May 25, 1965 4 Sheets-Sheet 4

United States Patent Office 3,373,670
Patented Mar. 19, 1968

3,373,670
CAMERA
William L. Lawson, Forest Hills, N.Y., assignor to Whitehouse Products, Inc., Brooklyn, N.Y., a corporation of New York
Filed May 25, 1965, Ser. No. 458,592
5 Claims. (Cl. 95—11)

ABSTRACT OF THE DISCLOSURE

A camera having a shutter, a fixed aperture and a blade movable relative to the shutter and aperture. The blade has a plurality of spaced apertures of different diameter in position to be aligned with the fixed aperture. Means responsive to insertion of a flash bulb in the flash socket to move the blade to align a particular one of the spaced apertures with the fixed aperture. The camera main housing is provided with a door for affording access to the socket, release means being provided to release the door latch and eject a spent flash bulb from the socket.

---

The present invention relates to photographic cameras and more particularly to a camera which embodies an improved aperture-changing construction.

Although the principles of the invention are applicable to other types of cameras, they will be shown and described in relation to a camera of the so-called film cartridge type as shown, described and claimed in the U.S. patent application of Venerio J. Rigolini, Ser. No. 458,593, filed May 25, 1965, to which application attention is directed for details of construction not specifically described herein.

Cameras embodying impact shutter mechanism are not new. However, under certain circumstances, e.g., when using a flash exposure, problems arise with such shutter mechanisms in having the flash synchronized with the shutter action to admit adequate light through the light-admitting aperture. When daylight exposures are to be used, the criticality of the shutter action is not so demanding.

The principal object of the present invention is to provide a camera having an improved aperture-changing construction.

Another object of the invention is to provide a camera in which the aperture-changing mechanism is automatically rendered effective by the insertion of flash equipment into the socket therefor in the camera.

Still another object of the invention is to provide such a camera in which a flash bulb socket is located within the camera, and the insertion of a flash bulb into the socket automatically changes the size of the opening of the light-admitting aperture.

A further object of the invention is to provide such a camera in which a flash attachment may be removably mounted on the exterior of the camera housing, which mounting automatically changes the size of the opening of the light-admitting aperture.

In one aspect of the invention, the principles thereof may be applied to a camera including a central main housing to which a front cover may be fixed that supports a member for admitting light to the interior of the camera. A back cover may be hinged to the main housing, and it may cover a compartment within the main housing adapted to contain a film cartridge of the type that includes spaced parallel chambers containing spools, and a flat, hollow, windowed portion joining the chambers, across which window, film having metering apertures along an edge passes as the film is wound from one spool onto a take-up spool. An example of such a film cartridge is found in United States Design Patent No. 195,746, issued July 23, 1963, to Hubert Nerwin.

In another aspect of the invention, a winding mechanism may be provided including a shaft that extends from inside the housing to the outside and which has a winding lever for oscillating the shaft. The opposite end of the shaft may include ratchet means for providing a unidirectional motion to the film as the shaft is oscillated. A metering mechanism may also be provided including a metering plate that is capable of being pivoted about the axis of said shaft as well as movable toward and from the shaft.

In still another aspect of the invention, the metering plate may include a finger, the end of which is resiliently pressed against the film edge so that as a metering aperture reaches it, the end of the finger moves into the aperture and it, as well as the metering plate, is carried along with the film until a tab on the plate locks into peripheral ratchet teeth on the winding mechanism, thereby preventing further winding, at which time an unexposed portion of the film is properly framed in the cartridge window.

In a further aspect of the invention, a stationary plate may be located within the main housing and it may include a fixed aperture in line with the axis of the light-admitting member and the window in the film cartridge. A shutter may be pivotally mounted on the plate for movement between positions where the light through the fixed aperture is blocked and where it is permitted to pass. An aperture-changing blade may also be pivoted on said stationary plate. It may include spaced apertures of different diameters. The arrangement is such that a smaller aperture is in line with the fixed aperture for daylight exposure, and a larger one is in line with the fixed aperture for flash exposure.

In a still further aspect of the invention, a shutter release may be provided: It may include a trip lever and a trip leg. The lever is pivoted on the stationary plate in the camera, and the trip leg is pivoted to the trip lever. The trip lever includes a portion that abuts a portion of the metering plate when the latter is in any position other than that to prevent further film winding, i.e., when an unexposed portion of film is framed in the cartridge window. The trip leg includes a portion that pivots the shutter against a spring bias to effect the exposure desired. The trip leg also has a cam surface that releases the metering finger from the metering slot in the edge of the film.

In another aspect of this invention, the aperture changing blade may be pivoted intermediate its ends and such that in one pivotal position, its small aperture is aligned with the fixed aperture, and in another pivotal position the larger aperture is so aligned. There may be a spring biased lever also pivoted in the camera, one of its ends being connected to the one arm of the aperture-changing blade and the other end being located beneath a socket within the camera for the reception of a flash bulb. The construction is such that upon insertion of a flash bulb into the socket, the lever is actuated to pivot the aperture-changing blade to the position where the larger of the two apertures is in line with the fixed aperture.

In a still further aspect of the invention, the lever that actuates the aperture-changing blade may be operated by the attaching of a flash unit to the exterior of the camera housing.

The above, other objects and novel features of the improved camera and aperture-changing mechanism will become apparent from the following specification and accompanying drawings which are merely exemplary.

In the drawings:

FIG. 1 is a top plan view of a camera to which the principles of the invention have been applied;

FIG. 8 is a sectional plan view taken substantially along line 8—8 of FIG. 4;

FIG. 9 is a perspective view of one form of shutter;

FIG. 10 is a perspective view of the shutter trip leg;

FIG. 11 is a perspective view of the shutter trip lever;

FIG. 12 is a perspective view of one form of aperture-changing blade; and

FIG. 13 is a perspective view of another form of aperture-changing blade.

Figure 2:
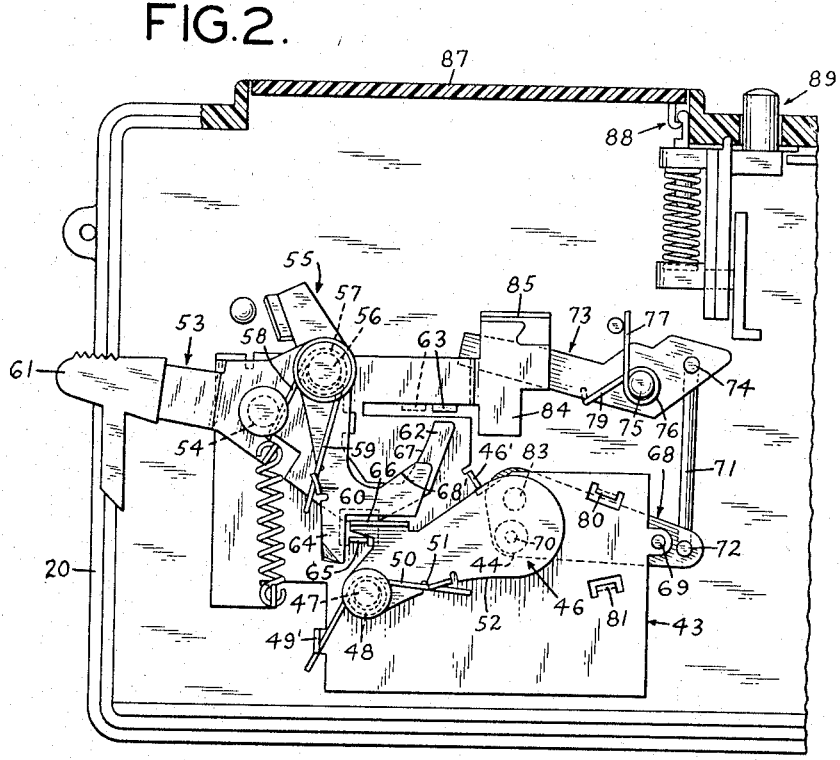
FIG. 2 is a sectional elevational view taken substantially along line 2—2 of FIG. 1, showing the shutter mechanism in its rest position.
Figure 3:
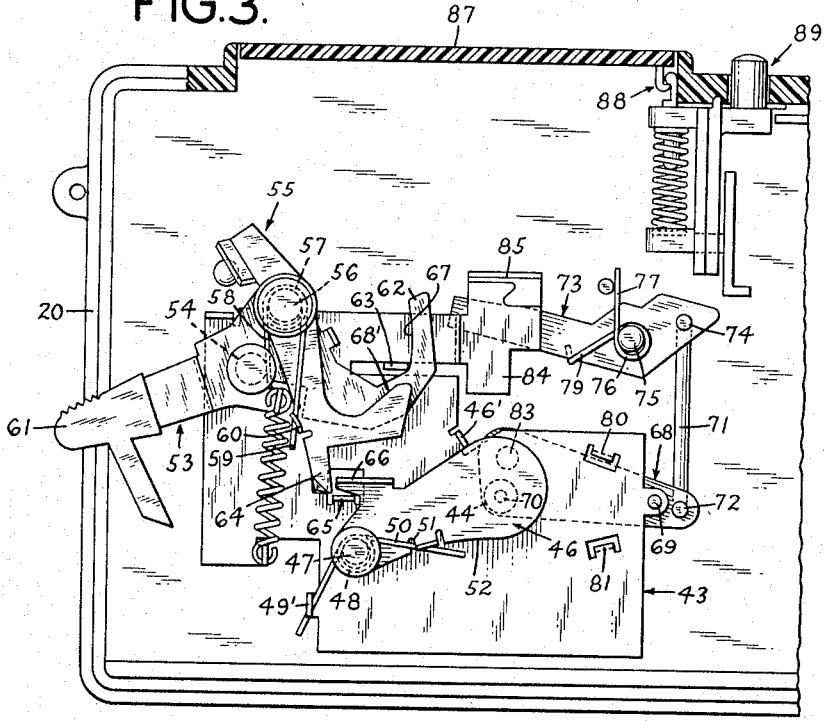
FIG. 3 is a view similar to FIG. 2, showing the shutter trip lever in the process of being actuated.
Figure 4:
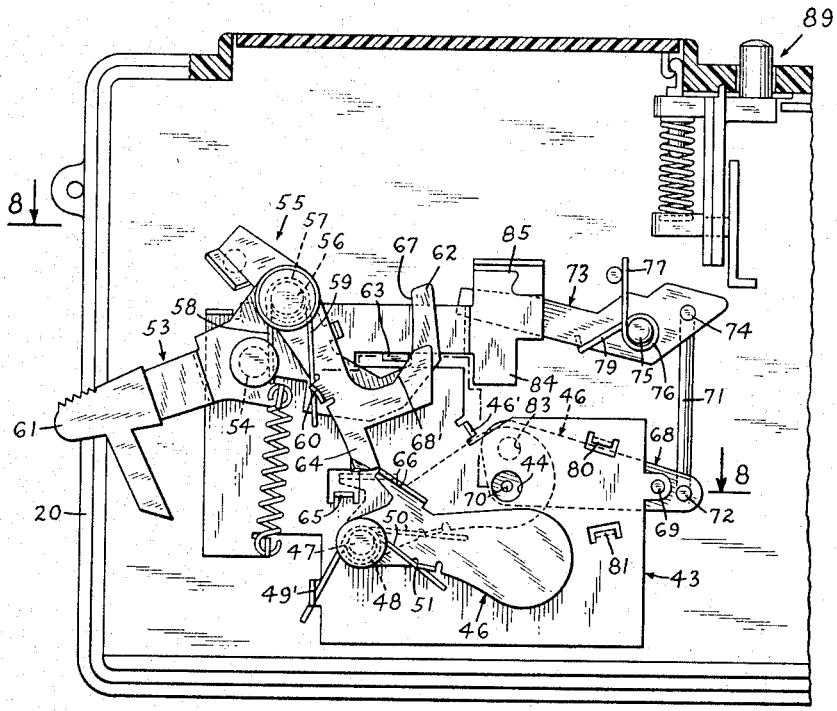
FIG. 4 is a view similar to FIG. 3, showing the shutter in position to expose the film.

Referring to the drawings, and particularly to FIGS. 1 and 8, the principles of the invention have been shown as applied to a camera including a central or main housing 20 having a front cover 21 that has fixed to it a light-admitting member 22. The member 22 includes a stepped, conical surface 23 leading to a lens 24. The main body 20 includes various compartments, one of which receives a film cartridge having two parallel chambers 25 therein (only one being shown in FIG. 8). Chambers 25 receive the spool-receiving compartments 26 (only one being shown) which are adapted to contain spools 27 onto and from which film is adapted to be rolled. The chambers 25 are connected together by a flat, hollow portion 28 through which film 29 passes in being rolled off one spool and onto another. The front wall 30 may include an aperture 31 of predetermined length past which metering apertures 32 pass as the film is rolled from one spool onto another.

A winding mechanism 33 may be provided for winding the film. It may be the same as the winding mechanism referred to in the above-mentioned patent application of Venerio J. Rigolini to which attention is directed for details not specifically shown and described herein. The winding mechanism may include a shaft 34 that extends from the inside of housing 20 to the outside thereof, and to the outer end of which a lever 35 may be connected for oscillating shaft 34.

The lower end of shaft 34 may include a member having face ratchets for cooperation with similar ratchets on the end of spool 27, as well as peripheral ratchet teeth 36, all as more fully described in said patent application aforementioned. A metering plate 37 may include a portion 38 having an elongated hole 39 therethrough, through which shaft 34 extends. Plate 37 is urged rightwardly (FIG. 8) by a spring 39'. Plate 37 includes a finger 40 having an upper portion 41 that is urged by spring 39' upwardly against the edge of film 29 by a slight pressure so that when a metering slot 32 comes along by virtue of the oscillation of lever 35, the end 41 of finger 40 passes into it, and finger 40 as well as plate 37 is moved to the left (FIG. 8) by the continued movement of film 29. Plate 37 includes a tap 42 which, when an unexposed portion of film 29 is properly framed in a window in the cartridge portion 28, engages ratchet teeth 36 to stop further winding of film 29, all as more fully disclosed in the above-referred-to application.

Referring to FIG. 2, a stationary plate 43 is mounted within housing 20. It may include a fixed aperture 44 therein which is in line with the axial centerline of lens 24 in cover 21 as well as with a lens 45 in the housing 20. The plate may support a shutter 46 on a pivot 47, around which a coil spring 48 is wound. One leg 49 of spring 48 contacts a tab 49' on plate 43 while the other leg 50 engages a notch 51 in the trailing edge 52 of shutter 46, urging it, in its rest position, to a point where it blocks the passage of light through the fixed aperture 44. In its rest position, shutter 46 abuts a stop 46' projecting from plate 43. When, however, the shutter is moved clockwise about pivot 47, it uncovers fixed aperture 44 to expose the film in the film cartridge.

A shutter trip lever 53 is pivoted to plate 43 by a pin 54, and a trip leg 55 is pivoted to lever 53 by a pin 56. A coil spring 57 surrounds pin 56. One leg 58 of spring 57 acts against pin 54 while the other leg 59 acts against a tab 60 on leg 55. Lever 53 includes a finger grip 61 and a portion 62 over which a finger 63 lies when the metering plate 37 is in any position other than that locking ratchet teeth 36, i.e., when an unexposed portion of film 29 is properly framed in the cartridge window. When such proper framing has occurred, finger 63 is in dotted line position (FIG. 2), permitting pivotal movement of lever 53.

Pivoting of lever 53 causes a heel portion 64 to ride up over a tab 65 on plate 43, thus causing its lower end to strike an abutment 66 on shutter 46, pivoting it clockwise to uncover fixed aperture 44 so as to expose the film 29. The lever 53 includes a cam surface 67 and leg 55 includes a surface 68', both of which act to disengage the end 41 of finger 40 from the metering slot 32, all as more fully described in the aforementioned application.

In order to vary the size of the aperture 44 so that a greater or lesser exposure of the film will occur, for example, when using a daylight exposure or flash exposure, an aperture-varying blade 68 may be pivoted to plate 43 by a pin 69. Blade 68 may include a small aperture 70 which is aligned with the fixed apertue 44, when blade 68 is in rest position, i.e., when a daylight exposure is to be made and no flash bulb is in the socket therefor. Accordingly, if finger piece 61 is completely depressed, shutter 46 permits light to pass from member 23 through aperture 70 to expose the film. Blade 68 is held in this rest position by a rod 71, one end of which is connected to one end of blade 68 at 72; and the other end of rod 71 is connected to a lever 73 at 74. Lever 73 is pivoted on a pin 75 on which a coil spring 76 is mounted, one leg 77 of which engages a fixed abutment 78, and the other leg 79 of which engages an edge of lever 73, urging it clockwise about pin 75. This therefore turns blade 68 clockwise about pin 69 until its leading edge contacts a tab 80 on plate 43 to align apertures 44 and 70. A similar tab 81 on plate 43 acts as a stop on the opposite edge of blade 68 when the latter is pivoted away from its rest position, as will now be described.

Figure 5:
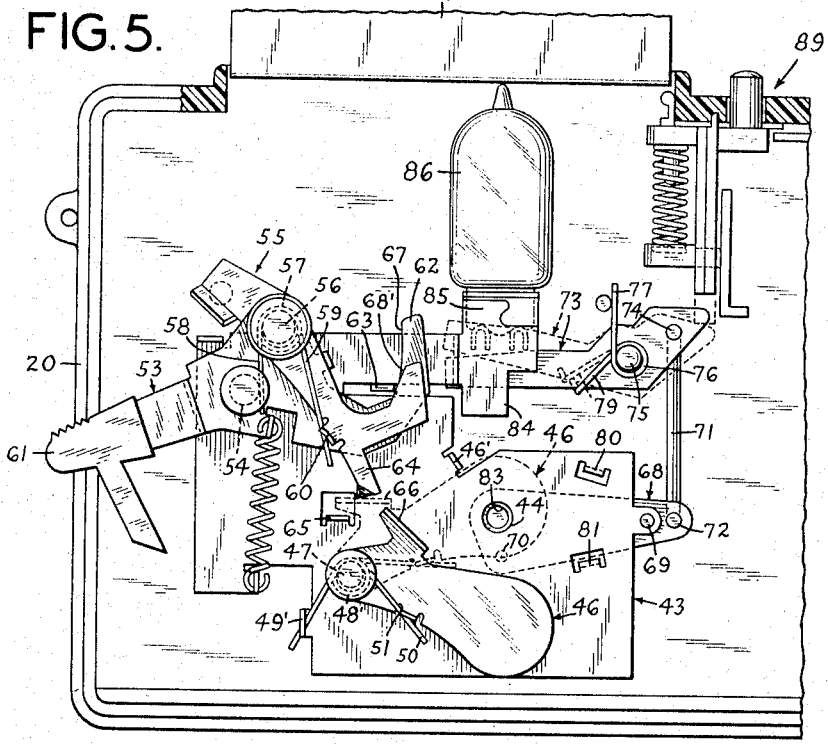
FIG. 5 is a view similar to FIG. 4, showing how the use of a flash bulb moves the aperture-changing blade.

Blade 68 also includes an aperture 83 that is larger than aperture 70 but somewhat smaller than aperture 44. A bracket 84 on plate 43 supports a socket 85 adapted to receive a flash bulb 86. Referring to FIG. 5, the free end of lever 73 extends beneath socket 85 so as to contact, and be moved by, the base of bulb 86 when inserted into the socket 85. This action moves levers 73 and 68 counterclockwise so that aperture 83 becomes aligned with fixed aperture 44 to permit more light to pass thru fixed aperture 44 when the finger member 61 is depressed to produce a flash exposure. Of course, batteries and electrical connections are provided between the shutter release mechanism and the base of the flash bulb 86 as is well known.

In the embodiment shown in FIGS. 2 to 5, access to the interior of housing 20, to insert bulb 86, is thru a hinged door 87 having a latch 88 and a release 89, which latter when operated with the camera inverted, opens door 87 and discharges the spent bulb 86, all as more fully disclosed in the above mentioned patent application.

Figure 6:
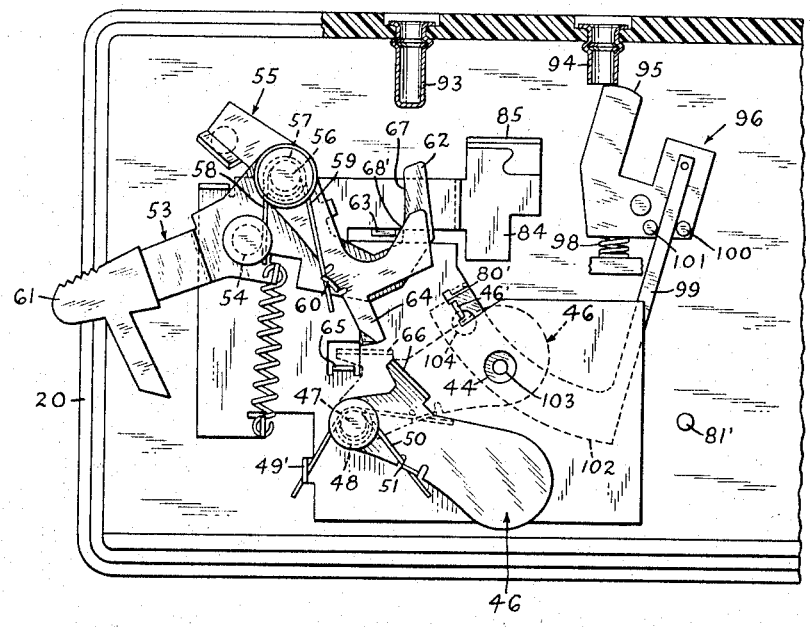
FIGS. 6 and 7 are views similar to FIGS. 4 and 5, showing a modified form of the invention.
Figure 7:
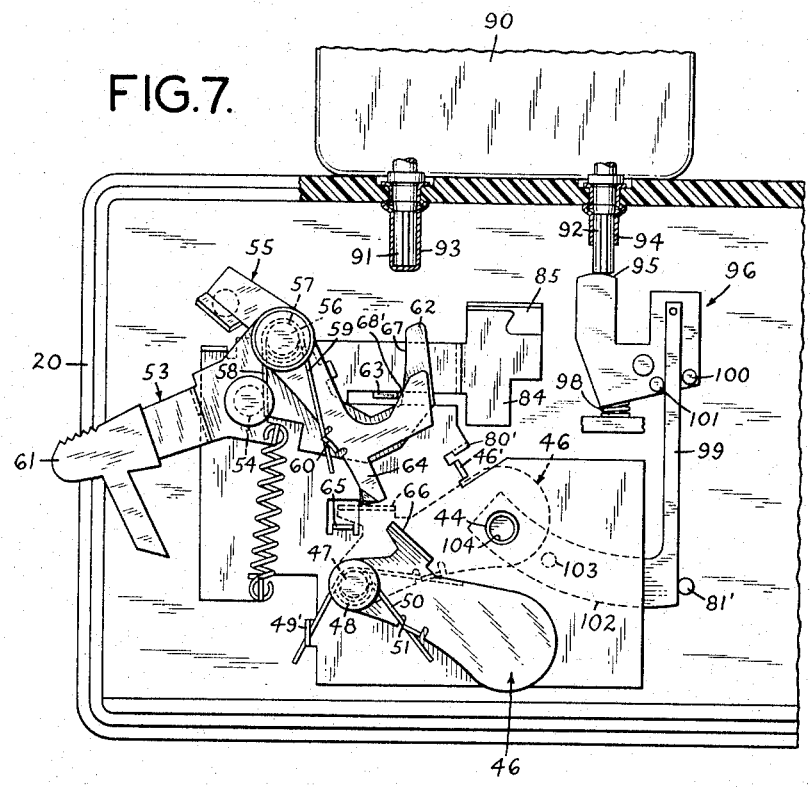

Referring to FIGS. 6 and 7, the principles of the invention are shown as applied to a camera to which a flash attachment 90, having prongs 91 and 92, is adapted to be inserted into sockets 93, 94 located in the top side of housing 20. All of the parts within the camera of FIGS. 6 and 7 are the same as those in the camera illustrated in FIGS. 1 to 5 and 8 to 11, except the construction of the aperture-changing blade and operating means therefor.

Referring to FIG. 6, the socket 93 is closed at its bottom, whereas socket 94 is foreshortened and open at its bottom and is in contact with a curved surface 95 on a generally U-shaped link 96 that is pivoted on a fixed pin 97 within housing 20. A spring 98 acts to pivot link 96 clockwise so that surface 95 engages the end of socket 94. A bar 99 may be pinned to link 96 and extend between two pins 100, 101 which contact opposite sides of bar 99. The lower end of bar 99 may have an arcuately shaped arm 102 integral therewith. Arm 102 may extend over the aperture 44 in plate 43. It may have two apertures 103 and 104 in spaced relation therealong, the aperture 103 being smaller than the aperture 104.

With the surface 95 contacting the end of socket 94, arm 102 is in position to align aperture 103 with fixed aperture 44 in plate 43 for daylight exposure. When, however, the flash attachment unit 90 is applied to the camera, its prong 92 forces link 96 and arm 102 counterclockwise so that aperture 104 becomes aligned with the fixed aperture 44 for flash exposure of the film 29. Stops 80' and 81' serve to align the apertures in arm 102 with the aperture 44.

While the invention has been described in connection with specific embodiments thereof and in a specific use, various modifications thereof will occur to those skilled in the art without departing from the spirit and scope of the invention as set forth in the appended claims.

What is claimed is:

1. In a camera, the combination comprising a main housing; a front cover on said main housing; a light-admitting member supported by said front cover; a fixed plate in said camera having a fixed aperture therein for admitting light from said light-admitting member to the interior of said camera; a back cover for said main housing for containing a film in position to be exposed by light from said light-admitting member; a shutter within said camera, normally springed-urged to a position blocking passage of light from said light-admitting member through said fixed aperture; shutter actuating means within said camera; a blade movable relative to said shutter and fixed aperture, said blade including a plurality of spaced apertures of different diameter in position to be aligned with said fixed aperture; means normally maintaining said blade in a position such that one of its apertures is aligned with said fixed aperture; a flash bub socket mounted within said main housing; a lever pivotally mounted in said main housing, one end of said lever lying beneath said socket in position to be contacted and moved by the base of a flash bulb when inserted in said socket; a link connecting said lever to said blade; door means in said main housing for providing access to the interior thereof to insert a flash bulb in said socket; latch means for holding said door means closed; and release means adapted when actuated to release said latch and act on said lever to eject a spent flash bulb from said socket.

2. In a camera, the combination comprising a main housing; a front cover on said main housing; a light-admitting member supported by said front cover; a fixed plate in said camera having a fixed aperture therein for admitting light from said light-admitting member to the interior of said camera; a back cover for said main housing for containing a film in position to be exposed by light from said light-admitting member; a shutter within said camera, normally spring-urged to a position blocking passage of light from said light-admitting member through said fixed aperture; shutter actuating means within said camera; a blade movable relative to said shutter and fixed aperture, said blade including a plurality of spaced apertures of different diameter in position to be aligned with said fixed apjerture; means normally maintaining said blade in a position such that one of its apertures is aligned with said fixed aperture; a plurality of prong-receiving sockets extending through one wall of said main housing; and means within said main housing rendered active by the insertion of the prongs of a flash attachment unit into said sockets for moving said blade to a position to align another of its apertures with said fixed aperture.

3. In a camera, the combination comprising a main housing; a front cover on said main housing; a light-admitting member supported by said front cover; a fixed plate in said camera having a fixed aperture therein for admitting light from said light-admitting member to the interior of said camera; a back cover for said main housing for containing a film in position to be exposed by light from said light-admitting member; a shutter within said camera, normally spring-urged to a position blocking passage of light from said light-admitting member through said fixed aperture; shutter actuating means within said camera; a blade movable relative to said shutter and fixed aperture, said blade including a plurality of spaced apertures of different diameter in position to be aligned with said fixed aperture; means normally maintaining said blade in a position such that one of its apertures is aligned with said fixed aperture; a plurality of prong-receiving sockets extending through one wall of said main housing; a pivoted lever within said housing having an arm in line wtih one of said sockets; resilient means forcing an end of said pivoted lever into contact with one of said sockets; and means connected to said pivoted lever and responsive to the plugging of the prongs of a flash attachment unit into said sockets for changing the position of said blade to align a different aperture therein with said fixed aperture.

4. In a camera, the combination comprising a main housing; a front cover on said main housing; a light-admitting member supported by said front cover; a fixed plate in said camera having a fixed aperture therein for admitting light from said light-admitting member to the interior of said camera; a back cover for said one main housing for containing a film in position to be exposed by light from said light-admitting member; a shutter within said camera, normally spring-urged to a position blocking passage of light from said light-admitting member through said fixed aperture; shutter actuating means within said camera; a blade movable relative to said shutter and fixed aperture, said blade including a plurality of spaced apertures of different diameter in position to be aligned with said fixed aperture; means normally maintaining said blade in a position such that one of its apertures is aligned with said fixed aperture; a plurality of prong-receiving sockets extending through one wall of said main housing; a pivoted lever within said housing having an arm in line with one of said sockets; means connecting said blade to said pivoted lever, said blade including a bar having an arcuate portion at the end thereof; and resilient means forcing an end of said pivoted lever into contact with one of said sockets, the construction being such that upon plugging the prongs of a flash attachment unit into said sockets, said pivoted lever is turned in a manner to cause a different aperture in said blade to be aligned with said fixed aperture.

5. In a camera, the combination comprising a main housing; a front cover on said main housing; a light-admitting member supported by said front cover; a fixed plate in said camera having a fixed aperture therein for admitting light from said light-admitting member to the interior of said camera; a back cover for said main housing for containing a film in position to be exposed by light from said light-admitting member; a shutter within said camera, normally spring-urged to a position blocking passage of light from said light-admitting member through said fixed aperture; shutter actuating means within said camera; a blade movable relative to said shutter and fixed aperture, said blade including a plurality of spaced apertures of different diameter in position to be aligned with said fixed aperture; means normally maintaining said blade in a position such that one of its apertures is aligned with said fixed aperture; a plurality of prong-receiving sockets extending through one wall of said main housing; a pivoted lever within said housing having an arm in line with one of said sockets; resilient means forcing an end of said pivoted lever into contact with one of said sockets; and means connected to said pivoted lever and responsive to the plugging of the prongs of a flash attachment unit into said sockets for changing the position of said blade to align a larger diameter aperture therein with said fixed aperture.

References Cited

UNITED STATES PATENTS

| 483,135 | 9/1892 | Bullard | 95—64 |
| 2,877,699 | 3/1959 | Fairbank | 95—11.5 XR |
| 3,001,461 | 9/1961 | Irwin | 95—11.5 |
| 3,184,584 | 5/1965 | Bundschuh | 95—11.5 XR |
| 3,259,043 | 7/1966 | Pagel | 95—11 XR |
| 3,286,611 | 11/1966 | Lange | 95—11 |

NORTON ANSHER, *Primary Examiner.*

F. L. BRAUN, *Assistant Examiner.*

UNITED STATES PATENT OFFICE
CERTIFICATE OF CORRECTION

Patent No. 3,373,670                                March 19, 1968

William L. Lawson

It is hereby certified that error appears in the above numbered patent requiring correction and that the said Letters Patent should read as corrected below.

Column 1, line 17, for "to move" read -- moves --; column 2, line 38, for "provided:" read -- provided. --; line 50, for "this" read -- the --; same line 50, for "aperture" read -- aperture- --; column 3, lines 4 and 5, for "substantailly" read -- substantially --; column 4, line 18, after "in" insert -- its --; line 34, for "apertue" read -- aperture --; column 5, line 42, for "springed-urged" read -- spring-urged --; line 49, for "bub" read -- bulb --; line 75, for "apjerture" read -- aperture --; column 6, line 40, strike out "one".

Signed and sealed this 15th day of July 1969.

(SEAL)
Attest:

EDWARD M. FLETCHER, JR.                   WILLIAM E. SCHUYLER, JR.
Attesting Officer                              Commissioner of Patents